United States Patent
Lindberg

Patent Number: 5,593,127
Date of Patent: Jan. 14, 1997

[54] ICE GUARD

[75] Inventor: Torsten G. Lindberg, Öckerö, Sweden

[73] Assignee: Telefonaktiebolaget LM Ericsson, Stockholm, Sweden

[21] Appl. No.: 91,014

[22] Filed: Jul. 14, 1993

[30] Foreign Application Priority Data

Aug. 7, 1992 [SE] Sweden ................... 9202312

[51] Int. Cl.$^6$ ................................. A47B 95/00
[52] U.S. Cl. .................... 248/345.1; 248/178.1; 248/398
[58] Field of Search ............... 248/179, 345.1, 248/371, 396, 398; 403/51, 160; 343/882; 74/18.1

[56] References Cited

U.S. PATENT DOCUMENTS

| | | |
|---|---|---|
| 1,397,413 | 11/1921 | Evans .................... 74/18.1 X |
| 2,119,955 | 6/1938 | Litton .................... 74/18.1 X |
| 2,770,139 | 11/1956 | Shen et al. ............... 74/18.1 |
| 3,018,992 | 1/1962 | Lore . |
| 3,082,632 | 3/1963 | Vulliez .................... 74/18.1 |
| 3,352,521 | 11/1967 | Tyler . |
| 4,556,182 | 12/1985 | Bentall et al. . |
| 4,967,609 | 11/1990 | Takagi et al. ............ 74/18.1 X |
| 4,989,884 | 2/1991 | Goodman ................ 403/51 X |
| 5,145,191 | 9/1992 | Stewart et al. .......... 403/51 X |

FOREIGN PATENT DOCUMENTS

| | | |
|---|---|---|
| 0327347 | 1/1989 | European Pat. Off. . |
| 3410158 | 9/1985 | Germany . |
| 1506206 | 9/1989 | Sweden ............... 74/18.1 |

*Primary Examiner*—Alvin C. Chin-Shue
*Assistant Examiner*—Korie H. Chan
*Attorney, Agent, or Firm*—Burns, Doane, Swecker & Mathis

[57] ABSTRACT

The present device relates to an ice guard (2) for facilitating the breaking-up of ice formations in conjunction with the use of turntables (1), and for protecting mechanical parts of an apparatus platform (4) from mechanical stresses, the platform being able to be tilted selectively in relation to a supportive surface (3). The ice guard (2) functions to protect mechanical parts of the apparatus platform from ice formations, among other things. The ice guard is comprised of a bellows structure (23) which surrounds mechanical parts of the apparatus platform (4) from the supportive surface (3) up to the apparatus platform (4). One end of the bellows structure (23) is firmly attached to the supportive surface (3) and the other end of the bellows structure extends up to the apparatus platform (4). In a first instance, in which the apparatus platform (4) is non-rotatable, the ice guard (2) includes a cover plate (19) to which the aforesaid other end of the bellows structure (23) is attached. In a second instance, in which the apparatus platform (4) is rotatable, the bellows structure (23) is attached to a bearing (26) between the aforesaid other end of the bellows structure (23) and the periphery of the apparatus platform (4).

9 Claims, 2 Drawing Sheets

5,593,127

ICE GUARD

TECHNICAL FIELD

The present invention relates to an ice guard for facilitating the breaking-up of ice formations in conjunction with the use of turntables, and for protecting mechanical parts of an apparatus platform from mechanical stresses, the platform being able to be tilted selectively in relation to a supportive surface, wherein the apparatus platform in a first instance is non-rotatable and carries a device having a rotatable shaft, and in a second instance is rotatable in relation to said supportive surface.

BACKGROUND ART

Many different types of turntables which carry apparatus platforms are known to the art. Examples of such turntables include turntables which carry radar antennas on ships, and turntables which carry cameras mounted on apparatus platforms for the purpose of filming moving objects. A common function of these turntables is to hold the radar antenna or the camera in a given position irrespective of how the supportive surface moves in relation to the radar antenna and the camera. Such turntables are also used for other types of apparatus than those mentioned.

Weather guards which protect the mechanical parts of the turntable are also known to the art. For instance, U.S. Pat. No. 3,352,521 discloses a weather guard for protecting the mechanics of a turntable suspension arrangement, whereas German Patent Specification DE 3,410,158 discloses a weather guard for protecting the mechanism of a pendulating indicator.

The drawbacks with such weather guards is that they are unable to function effectively in more extreme weather conditions, such as ice, snow, rain, and storms of various kinds. It is known that ice and freezing rain will build coatings of ice on apparatus platforms, for instance, which will not only place strain on the drive systems, bearings and carrier arms of such platforms, but will also damage the rubber, plastic and thin-plate lip seals mounted on the turntable, among other things.

SUMMARY OF THE INVENTION

The object of the present invention is to eliminate the drawbacks of the known weather guards.

The inventive concept lies in the provision of an ice guard which will facilitate the breaking-up of ice formations when used on turntables and which will also protect the mechanical parts of an apparatus platform. The ice guard is comprised of mechanical parts and the apparatus platform. The turntable can be tilted selectively in relation to a supportive surface. The ice guard is intended to protect two types of turntable. In a first instance, the apparatus platform is non-rotatable and can be inclined laterally. Mounted in the centre of the platform is a transmission means which can rotate about its own axis. In a second instance, the platform is rotatable, i.e. is rotatable about its own axis, and can be tilted laterally.

One advantage afforded by the ice guard is that ice and freezing rain adhering to the guard can be easily removed therefrom. The influence exerted by external elements will prevent the turntable from regaining its mobility quickly enough. Removal of ice and freezing rain from the ice guard shortens the time taken for the turntable to regain its mobility, among other things. Another advantage afforded by the inventive ice guard is that it protects those mechanical parts which lie outermost. Still another advantage is that the ice guard can be mounted on all types of turntable.

Other objects of the invention and advantages afforded thereby will be evident from the following description of preferred exemplifying embodiments thereof, made with reference to the accompanying drawings.

DETAILED DESCRIPTION BEST MODE OF CARRYING OUT THE INVENTION

The following description relates to exemplifying embodiments of an ice guard which is intended to be mounted on a turntable onboard ship.

Figure 1:
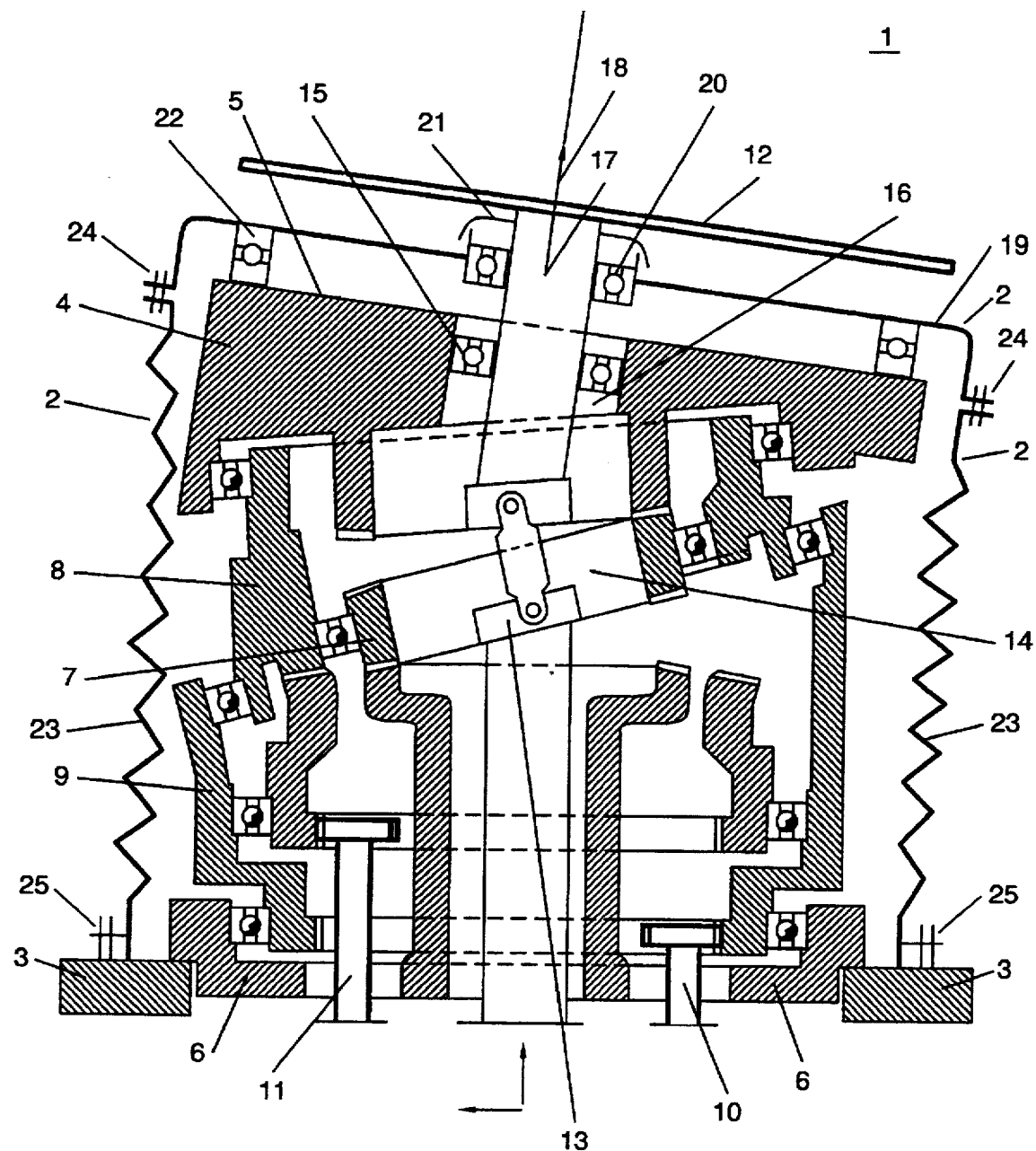
FIG. 1 illustrates a turntable with an apparatus platform non-rotatably mounted thereon.

FIG. 1 illustrates a first exemplifying embodiment comprising a non-rotatable turntable 1 and an ice guard 2, the turntable 1 being intended to carry a radar antenna. The turntable 1 is constructed so as to be able to position the radar antenna in a fixed position irrespective of how a supportive surface 3 moves. The turntable 1 is thus able to compensate for pitching and heaving motion of the ship, so as to hold the surface 5 of an apparatus platform in a fixed horizontal plane, irrespective of ship movement. The turntable 1 is described in more detail in Swedish Patent Specification SE 8401534-6.

The illustrated turntable 1 is comprised of an attachment annulus 6 which is firmly mounted on a supportive surface 3, in the illustrated case on the deck of the ship. In order to maintain the platform surface 5 constantly in a horizontal plane, the turntable 1 is constructed from several different sleeves 7, 8 and 9 which are driven by a first and a second gear drive 10, 11.

In the case of the first embodiment of the turntable 1, the apparatus platform 4 is non-rotatable and the platform 4 can be tilted solely in the horizontal direction. In order to enable the turntable 1 to rotate when the platform 4 is non-rotatable, it is necessary to include a rotatable platform 12. The radar antenna is then mounted on the platform 12, the transmission means 13 of which is mounted in the centre cavity 14 of the turntable 1. One end of the transmission means 13 is attached to the shaft 17 of the platform 12, while the other end of the transmission means is connected to a motor by means of which the platform is pivoted. A bearing 15 is mounted firmly in a space 16 in the platform 4 with the shaft 17 where the platform 12 is mounted on said one end of the shaft 17, which means that the platform 12 will move to the same level of inclination as the platform 4 and, at the same time, is able to pivot about its own pivot axis 18. The illustrated embodiment also includes a sheetmetal plate 19 which covers the upper part of the apparatus platform such as to provide a fully enclosed space around the turntable 1. The cover plate 19 is firmly mounted on a bearing 20 in a manner to enable the shaft 17 to rotate in relation to the cover plate 19. In order to reduce the problematic effect of ice and rain for instance, the bearing 20 on the shaft 17 is covered by a cover 21. Mounted on the surface 5 of the apparatus platform is a thrust bearing 22 which is intended to take-up rotational stresses that occur when the shaft moves and the bearings are frozen solid. The thrust bearing 22 also functions to hold the cover plate 19 in the same plane as the platform surface 5. The inventive ice guard 2 is comprised of an elongated bellows structure 23 whose one end extends down to the supportive surface 3, where the bellow structure 23 is attached to said supportive surface 3 with the aid of a second attachment device 25, whereas the other end of the bellows structure is attached to the cover plate 19 with the aid of a first attachment device 24.

Figure 2:
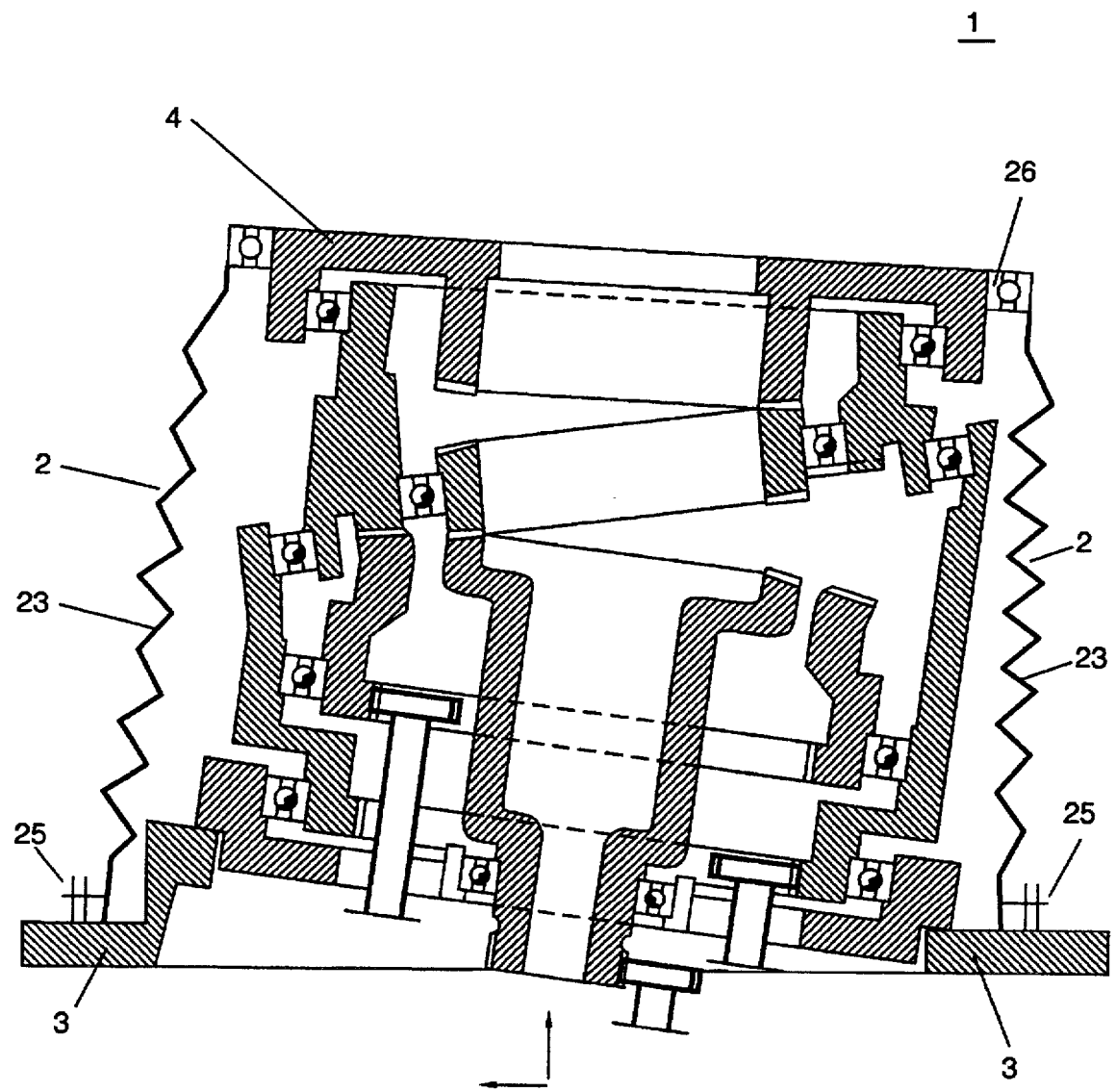
FIG. 2 illustrates a turntable with an apparatus platform rotatably mounted thereon.

The ice guard 2 works as follows. In harsh weather conditions, the mobility of the turntable 1 may be impaired by the effects of freezing rain and/or snow together with heavy winds and cold. The ice guard 2 is needed in conditions such as these in order to prevent external environmental factors inhibiting the mobility of the turntable 1, among other things. When the turntable 1 is tilted horizontally, the bellows structure 23 is caused to flex and bend and therewith break away ice that has formed on the bellows structure. The outer surfaces of the bellows structure will suitably be comprised of Teflon® or some other water-repelling material, so that ice will not adhere to these outer surfaces. Only a moderate force is needed to deice the bellows structure, therewith reducing the risk of mechanical damage. In cold weather conditions, a heating source system can be used to heat the bearings 15, 20, 22 of the sleeves 7, 8 and 9 of the illustrated embodiment, and the bearings 26 of the FIG. 2 embodiment. These heating sources having the form of electrical resistances through which current is passed. The heating sources are mounted on the insides of respective sleeves 7, 8 and 9. However, it cannot be certain that the heat generated will be sufficient to melt through the entire ice covering. It is possible that an outer layer of ice will still remain and therewith render the turntable 1 inoperative for the moment. It is possible to melt away a layer of ice nearest the surface of the bellows structure. This will protect the surface of the bellows structure from attrition and wear, and will also enable the ice to be broken-up more readily as the bellows structure 23 is flexed. This surface ice melting facility can be readily achieved by mounting heating loops 32 (as illustrated in FIG. 2) on the inner surface of the bellows structure, which is facilitated by the intrinsic pleated or corrugated configuration of said structure. Furthermore, the corrugated configuration of the bellows structure means that only a relatively small amount of heat is needed to remove the ice from the outer surfaces of said structure. When adopting this measure and also the measures earlier mentioned, the amount of ice that adheres to the surfaces will be less than would otherwise be the case. The turntable 1 is now able to move freely, even though the bellows structure 23 is partially covered with ice. Another method of facilitating the loosening of ice is to fit over the bellows structure 23 some form of stocking 30 (illustrated in FIG. 2) which will conform to the outer configuration of the bellows structure to the greatest possible extent. This is able to facilitate breaking-up of ice layers, as the stocking does not itself have any mechanical rigidity. The stocking will preferably be comprised of a water-impermeable material, and will also have properties which will enable it to be fitted or threaded over the bellows structure 23 when mounted.

FIG. 2 illustrates a second exemplifying embodiment of a turntable 1 provided with an ice guard 2, this turntable being described in more detail in Swedish Patent Specification SE 8401534-6. The ice guard 2 is of the same kind as that described with reference to the first embodiment. The apparatus platform 4 can be tilted horizontally, and the apparatus platform 4 is also rotatable. A radar antenna is mounted on the platform surface 5. The inventive ice guard 2 is comprised of the bellows structure 23 which is attached firmly to the periphery of the apparatus platform with the aid of a bearing 26. The bellows structure 23 extends down to the supportive surface 3 and is there attached to said supportive surface with the aid of a second attachment device 25. It will be understood that the ice guard 2 of the second embodiment has the same function as the ice guard of the first embodiment.

One of the advantages afforded is that ice which forms on the bellows structure 23 can be removed more easily therefrom. Another advantage is that the bellows structure 23 provides the turntable 1 with protection against the effects of ice, water, dust, etc. The bellows structure 23 also affords some mechanical protection against the influence of the actual apparatus platform 4.

It will be understood that the invention is not restricted to the aforedescribed and illustrated exemplifying embodiments thereof and that modifications can be made within the scope of the following Claims.

What is claimed is:

1. An ice guard for breaking ice formations on and protecting from stress components of a turntable platform apparatus, comprising a turntable platform apparatus including at least a tiltable platform at an upper end and a supporting base at a lower end, the ice guard comprising:

a bellows structure having a first and a second end, the first end fastened to the supporting base, the bellows structure extending from the supporting base to the tiltable platform and enclosing all components of the turntable apparatus between the supporting base and the tiltable platform; and, means for attaching the second end of the bellows structure at the upper end of the turntable platform apparatus to permit relative rotation between the bellows and the turntable platform apparatus.

2. An ice guard according to claim 1, wherein a thrust bearing is mounted on the apparatus platform and holds up the cover plate.

3. An ice guard according to claim 1, wherein the bellows structure is comprised of water-repelling material.

4. An ice guard according to claim 1, further comprising means for heating the region enclosed by the ice guard from within.

5. An ice guard according to claim 1, wherein heating loops are mounted on the inner surface of the bellows structure.

6. An ice guard according to claim 1, further comprising means for heating the bearings.

7. An ice guard according to claim 1, further comprising stocking means fitted over the bellows structure and functioning to facilitate the loosening of ice from said bellows structure.

8. The ice guard as claimed in claim 1, wherein the platform apparatus includes a turntable mounted on a rotatable shaft extending through the platform, the ice guard further comprising:

a cover plate mounted to a rotatable bearing fixed to the shaft and covering the platform, the second end of the bellows structure attached to the cover plate to enclose the platform apparatus; and, a bearing cover attached to the shaft for covering the rotatable bearing.

9. The ice guard as claimed in claim 1, wherein the apparatus platform is rotatably mounted relative to the supporting base, the ice guard further comprising:

a rotatable bearing mounted to a periphery of the apparatus platform, the bellows structure attached to the rotatable bearing for relative rotation between the bellows and the apparatus platform.

\* \* \* \* \*